INVENTOR
Anthony D'Onofrio
BY Spencer, Rockwell & Bartholow
ATTORNEYS (FOR FIXED POWER LEVEL)

INVENTOR
Anthony D'Onofrio
BY Spencer, Rockwell & Bartholow
ATTORNEYS

United States Patent Office 3,192,291
Patented June 29, 1965

3,192,291
METHOD OF CURING CEMENTITIOUS MATERIAL BY RADIO FREQUENCY ENERGY
Anthony D'Onofrio, West Hartford, Conn., assignor to Pratt & Whitney Inc., a corporation of Delaware
Filed May 15, 1962, Ser. No. 194,821
6 Claims. (Cl. 264—26)

This invention relates to a method for facilitating chemical reaction such as hydration and the like, and more particularly to a method for curing cementitious products.

The curing and drying of cementitious products, such as cementitious concrete materials in the form of slabs, structural elements, blocks and the like, is an old art dating back many centuries. The development of acceptable strength for such cementitious products is tied to chemical reactions which take place in the cementitious concrete. The primary chemical reactions that take place in such cementitious concrete products are the hydration reactions. The specific hydration reactions depend upon the source of the cement employed and, for the most part, involve four basic hydration reactions. These four basic reactions involve the hydration of (1) tricalcium aluminate, (2) tetracalcium aluminoferrite, (3) tricalcium silicate and (4) dicalcium silicate which are interrelated as follows:

Of the remaining reactions, the hydration of tetracalcium aluminoferrite goes to completion quickly, within a matter of hours, while the hydration of tricalcium silicate takes up to 14 days and the hydration of dicalcium silicate takes up to 28 days. In fact, it is theorized that the last hydration reaction never goes to one hundred percent completion.

Those skilled in the art are well aware of the fact that the reactions of tricalcium silicate and dicalcium silicate are critical ones and ones that must be carried to substantial completion to develop the desirable physical properties of cementitious concrete products. Accordingly, in fabricating concrete slabs, concrete blocks and the like, water is supplied to the cementitious material after the initial set, which occurs after the completion of the first reaction enumerated above, to drive the remaining reactions to completion. As indicated above, under normal conditions the remaining reactions take up to 28 days for substantial completion. In fabricating concrete blocks, slabs and the like, it is desirable that this time be substantially decreased in order to avoid the tremendous storage and material-handing problems and yet provide a product of acceptable physical properties.

It has been well known in the art that heat accelerates all of the hydration reactions enumerated above and therefore heat, where possible, has been used to elevate the temperature of the cementitious concrete material to

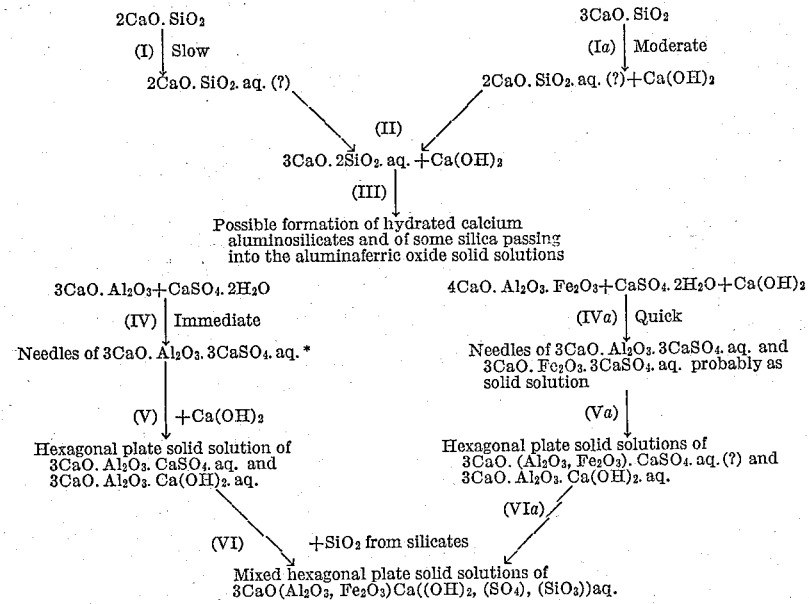

Hydration of Portland Cement

\* The hexagonal plate solid solution of $3CaO.Al_2O_3.CaSO_4$. aq. and $3CaO.Al_2O_3.Ca(OH)_2$. aq. may appear first and convert to the $3CaO.Al_2O_3.3CaSO_4$. aq.

This is set forth, for example, in the text, "The Chemistry of Cement and Concrete," by F. M. Lea, Copyright 1956, 2nd Edition, by Edward Arnold Ltd. of London, England.

Since these four reactions are hydration reactions, water must be mixed with or supplied to the cementitious concrete in order for these reactions to go to completion. The first reaction of tricalcium aluminate goes to completion immediately within a short period of time, that is, in the matter of a few hours, so that any cementitious product that contains a high amount of this substance is termed in the art as a quick-setting cementitious product. However, in order to develop acceptable strength for the cementitious product, it is necessary that all of the reactions be substantially completed. It is the completion of all of the reactions which is responsible for the desirable physical properties of cementitious concrete products.

increase the hydration reaction rates. For example, it has been observed that the reaction rates increase rapidly with the use of elevated temperatures and for homogeneous reactions the rates increase at least two to three fold for every 10° C. rise in temperature.

In the concrete block industry, for example, machines turn out so-called "green" blocks at the rate of at least 10,000 blocks per eight hour day. In order to avoid the tremendous storage problems that would normally be encountered by allowing the block to "yard" cure for 28 to 30 days, these "green" blocks are placed in low temperature (about 160° F.) kilns. Thereafter the blocks are removed from the kiln and allowed to yard cure for an additional period of time to make sure that the tricalcium silicate and dicalcium silicate reactions set forth above are substantially completed. While kiln drying proved to be an advance, it presented limitations because, by using an external heat source, thermal gradients were produced in the block due to the low thermal conductivity of the cementitious concrete material, which prevented the use of elevated temperatures for further facilitating the hydration reactions. For instance, the temperature could not be such as to vaporize the water, because this vaporization could diminish the water available and necessary for the completion of the hydration reactions. In addition, the temperature gradients from the innermost to outermost regions of the product had to be kept within certain well defined limits in order to prevent cracking. The cracking is produced by the differential expansion of the cementitious product which is created for the most part by the temperature gradients within the cementitious product. In addition, the temperature gradients also produce a differential rate of hydration, with the outermost regions of the cementitious product hydrating first because they are at a more elevated temperature. Thus the reactions at the outermost regions of the product deplete the innermost regions (which are at a lower temperature) of water. This water is made available to the outermost regions of the product by a differential pressure phenomenon.

In an effort to improve upon so-called "kiln" drying, the well-known autoclaving method was developed. In this particular process as originally conceived, cementitious concrete materials in the form of slabs and blocks were placed in a pressure chamber which was supplied with supersaturated steam. In this method, the objective is to raise the temperature of the cementitious concrete product by the use of super saturated steam so that at the elevated temperatures above 212° F., water, in the liquid state is available for the hydration reactions to take place. In so doing, it was possible to operate at elevated temperatures over and above those employed in kiln curing and, to some extent, reduce the loss of water from the innermost regions of the block by reason of the pressure in the chamber. By using such a method the normal curing time for the cementitious products was reduced substantially from 28 days down to about a day and, in some instances, about 12 hours. Nevertheless, the problems enumerated above in connection with kiln curing are still present but to a lesser extent.

In both the kiln curing and autoclave curing methods the ratio of the local block temperature (of a cylindrical block) to environmental temperature plotted against the block radius as a function of time is represented by the temperature transient chart shown in FIG. 1, where $v$ is the block temperature in ° F.
$V$ is the environmental temperature in ° F.
$K$ is the coefficient of thermal diffusivity in ft.$^2$/hr.
$a$ is the radius of the block in feet
$T$ is time in hours
$r$ is the distance to a point in the block In contrast with the prior art methods, I have discovered a method of facilitating chemical reactions such as the hydration reactions in cementitious concrete materials and the like, in which the reaction rates are substantially increased. In the method according to my invention the disadvantages of the prior art methods are substantially eliminated because my method is independent of the thermal diffusivity ($K$ identified above) of the cementitious concrete product, for example. Consequently, the temperature distribution is no longer a function of time and is controlled by the power so that the temperature can be elevated very rapidly to drive the hydration reactions to completion at an accelerated rate without casing deleterious effects to the product. Hence by my method cementitious concrete products are cured by substantially homogeneous hydration reactions throughout the product. This is accomplished by the use of relatively inexpensive equipment which is easy to install and which may be easily employed in mobile operations.

In view of the foregoing, an object of my invention is to provide a method for facilitating chemical reactions of cementitious materials by subjecting the material to a high frequency electric field under controlled conditions.

Another object of my invention is to provide a method for facilitating the hydration reactions of cementitious materials by subjecting the material to a high frequency electric field under controlled conditions.

Still another object of my invention is to provide a method for curing cementitious products in a comparatively short time by controlling the hydration reactions throughout the cementitious products.

A further object of my invention is to provide a method for curing cementitious products by subjecting the products to a high frequency electric field while supplying liquid water to the surface of the product.

Other objects of the invention will in part be obvious and will in part appear hereafter.

The invention accordingly comprises the several steps and the relation of one or more of such steps with respect to each of the others, and the product which possesses the characteristics, properties and relation of constituents, all as exemplified in a detailed disclosure hereinafter set forth and the scope of the invention will be indicated in the claims.

For a fuller understanding of the nature and the objects of the invention, reference should be had to the following detailed description taken in connection with the accompanying drawing in which like reference numerals designate like parts throughout the figures thereof and wherein.

Figure 1:
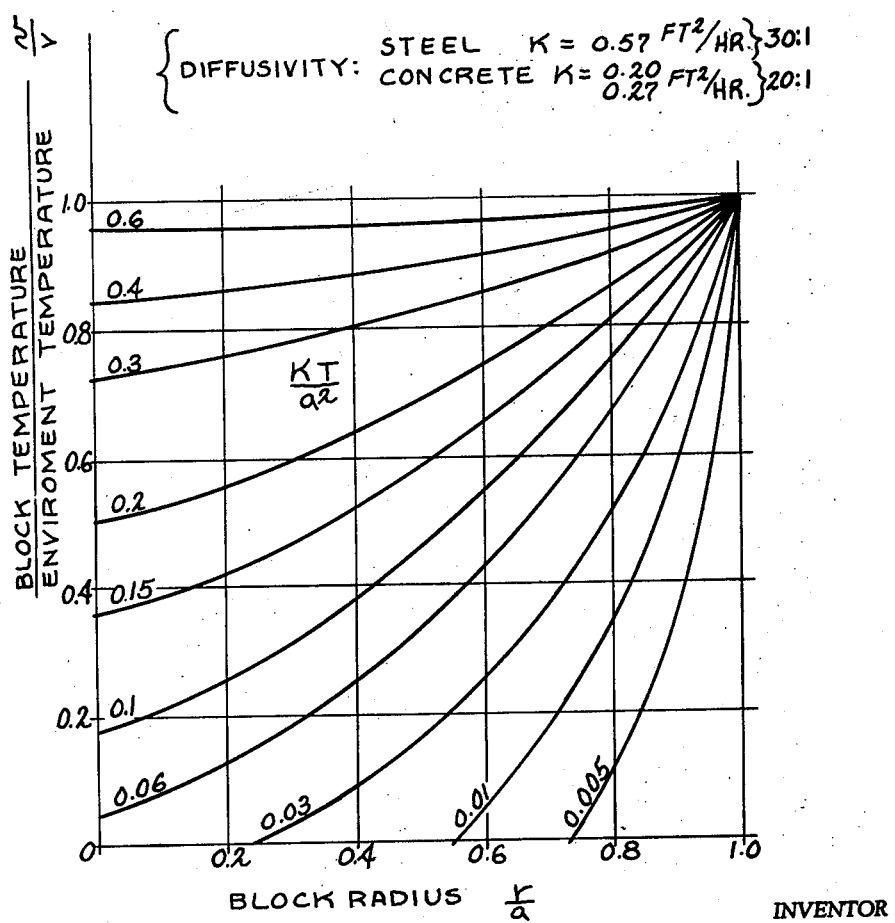
FIG. 1 is a graph showing the temperature transient characteristics of the prior art methods.
Figure 2:
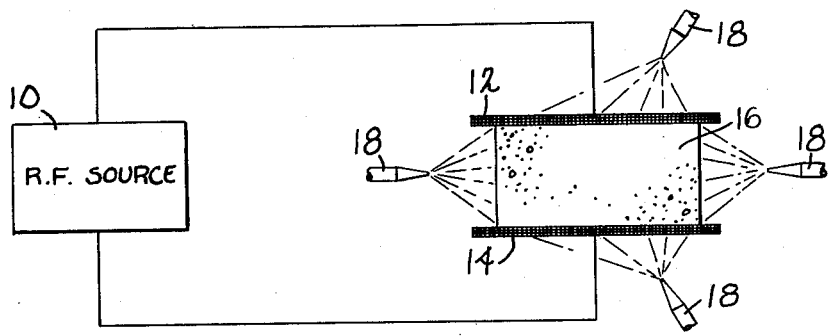
FIG. 2 is a digrammatic illustration of a system embodying my invention.

Referring now to the drawing, there is shown in FIG. 2, which illustrates an embodiment of my invention, a source of high frequency electric energy 10 which is connected to electrodes 12 and 14. These electrodes may take the form of solid metal plates, porous metal plates, metal screens or the like. The high frequency energy source may be supplied from an oscillator or the like, supplying a high frequency electric field, such as radio frequency energy field. A cementitious product 16 is placed between the electrodes 12 and 14 so that the energy in the electric field is absorbed by the product. Since the cementitious product is a dielectric material, the entire block, slab, etc., as the case may be, is uniformly raised to an elevated temperature. Liquid water is supplied from suitable outlets or sources, generally indicated at 18, so that the surface of the block or slab is provided with water for the hydration reactions to take place.

Figure 3:
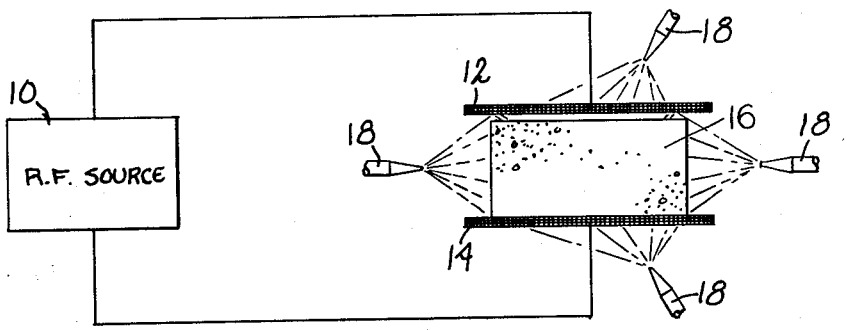
FIG. 3 is a modification of the system shown in FIG. 1.

In the modification shown in FIG. 3, the electrode 12 is shown so that it does not contact the block, thereby making it possible to cure the block on a continuous basis. Of course it is to be understood that the particular arrangement of the apparatus may take many forms depending upon the particular application. For example, in the curing of roadbed cementitious concrete slabs, the high frequency source of energy could be contained in a vehicle which travels over the roadbed and which contains an electrode comparable to electrode 12. The electrode 14 could be the metal support forms employed during the initial forming operation, which could be contacted by a conductor depending from the vehicle to complete the circuit to the energy source. In addition, the vehicle could be provided with a series of nozzles for spraying water onto the surface of the slab, it being understood, of course, that the basic invention is not limited to the form or nature of the apparatus employed, but generally to the basic apparatus necessary for carrying out the method.

Figure 4:
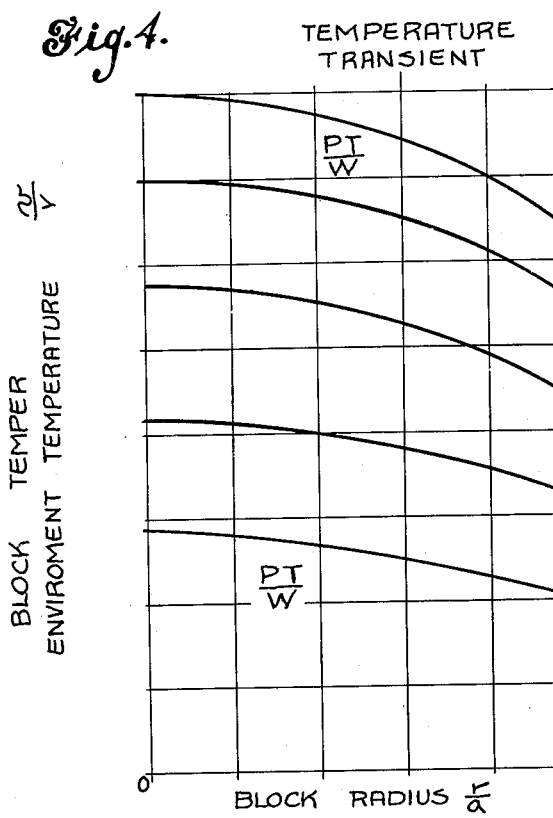
FIG. 4 is a graph showing the temperature transient characteristics of the method according to my invention.

In utilizing the method and apparatus mentioned above, it is evident that the source of heat applied to facilitate the hydration reactions is such that it is internal and uniformly distributed throughout the product. As such there are only minor temperature gradients produced by the source of heat, per se. This is emphasized in the graph shown in FIG. 4 where $v$ is the block temperature in °F.
$V$ is the environmental temperature in °F.
$a$ is the radius of the block in feet
$r$ is the distance to a point in the block
$T$ is the time in hours
$P$ is the energy absorbed in kilowatts
$W$ is the weight of the block in pounds.

In order to be sure that water is available throughout the block for the hydration reactions to take place, liquid water at a suitable temperature can be applied to the surface as indicated. While the application of water to a block at an elevated temperature above that of the water may create a transient temperature gradient, the effect of such gradient is minimized because the local dielectric constant of water changes the local capacitance which in turn increases the local power absorbed. Consequently the local block temperature is rapidly restored. However, a phenomenal condition is produced according to my invention, in that the hydration reaction rates are slightly greater in the innermost regions of the block because of the slightly greater temperature in the innermost regions of the block. This slightly greater temperature at the innermost regions of the block is caused by the radiation losses to the environment at the surface of the block. It is theorized that the accelerated hydration reactions in the innermost regions of the block create a pressure gradient across the cementitious product with the lower pressure at the innermost regions thereof. This promotes the flow of water into the cementitious product. In addition, since there is a high level of water concentration at the immediate region where the water is supplied, a capillary pressure is created which also promotes the flow of water into the cementitious product. This water can be supplied continuously or periodically in the form of a water spray which is used to wet down the block during curing. All the hydration reactions enumerated above are thus accelerated under controlled conditions.

Figure 5:
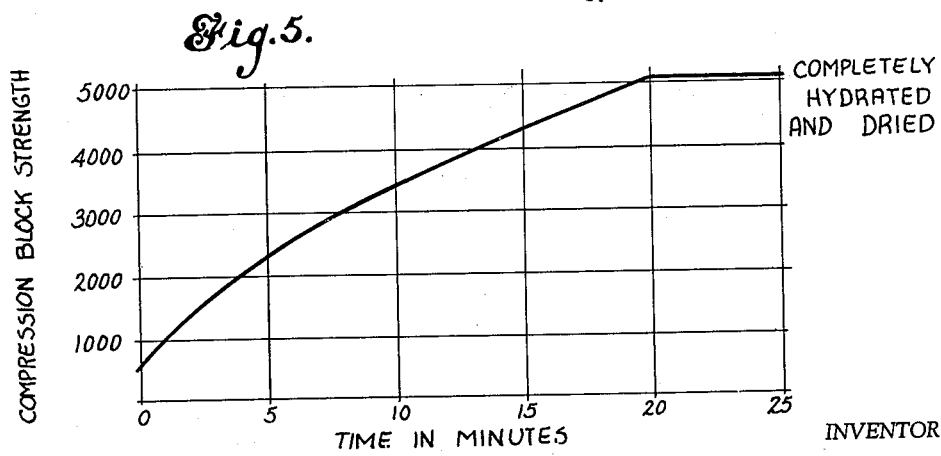
FIG. 5 is a graph showing block strength as a function of time for a block cured by my method.

As such, a block can be cured using this method within minutes. For example, in some of the tests that have been run, a 2" x 2" cylindrical specimen of cementitious concrete material was subjected to a frequency of 27 megacycles per second for various periods of time. The compressive strength of the cylindrical specimen produced as a function of time for a given power level is shown in FIG. 5. This was obtained from a mix consisting essentially of

| Filler | Weight (gms.) |
|---|---|
| #4 pea gravel | 62.5 |
| #8 stone | 37.5 |
| #16 sand | 37.5 |
| #30 sand | 75.0 |
| #100 sand | 25.0 |
| Dust | 12.5 |
| Type III Portland cement | 33.3 |
| Calcium (lime) | 5.0 |
| Water | 20.0 |

Wetting agent (detergent, etc.), 5 drops.

The above method was carried out under conditions which normally would produce severe cracking. However, due to the phenomenon enumerated above, blocks have been cured in as little as 5 minutes by subjecting them to radio frequency electric fields sufficient to raise their temperature to 300° F. and more without producing appreciable cracking.

As far as the drying of the cured cementitious blocks is concerned, this can be controlled by heating the block to temperatures of, say, 350° F. or more but less than the temperature at which the water of hydration is driven off, without supplying water. This drying step is employed in my method after curing has been effected, and may be facilitated by increasing the power level applied between the electrodes 12 and 14. In either the curing or drying cycle the power absorbed by the cementitious product can be varied by changing the spacing of either electrode from the cementitious product as shown in connection with the electrode 12 in FIG. 3 of the drawings. In addition, the instant method may be employed to further develop the desirable physical and chemical properties of cementitious concrete products cured by other methods, if the hydration reactions in these products have not gone to completion to any great extent.

It will thus be seen that the objects set forth above and, more particularly, the production of cured cementitious concrete products from typical mixes with strengths of at least 2000 p.s.i., in less than one hour, without damaging cracks, among those made apparent from the preceding description are efficiently attained and since certain changes may be made in the carrying out of the above method, and in the compositions set forth without departing from the scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Having described my invention, what I claim as new and desire to secure by Letters Patent is:

1. A method for facilitating hydration of calcarious cement which consists of a mixture of cement, sand and water in the form of a slurry or a green block, comprising the steps of supplying water to the surface of the aggregate while subjecting the aggregate to a high frequency field.

2. A method for facilitating the hydration reaction of calcarious cement in the form of an aggregate consisting of cement, sand and water, comprising the steps of; supplying water to the surface of the aggregate while subjecting the aggregate to a radio frequency electric field.

3. A method of making products of calcarious cements which undergo a hydration reaction which calcarious cements are in the form of an aggregate consisting essentially of cement, sand and water, comprising the steps of; supplying water to the surface of the aggregate forming the product while subjecting the cement to a radio frequency electric field.

4. The method of claim 3 further defined in that the temperature at the outer surface of the aggregate is less than the temperature at the innermost regions of the aggregate.

5. The method of claim 2 wherein the hydration reactions are from the group consisting essentially of hydrations of tricalcium aluminate, tetracalcium aluminoferrite, tricalcium silicate and dicalcium silicate.

6. A method for facilitating the curing of an article formed essentially of cement, sand and water, comprising the steps of; supplying water to the surface of the article while uniformly heating said article by subjecting it to a high frequency electric field.

(References on following page)

References Cited by the Examiner

UNITED STATES PATENTS

| | | |
|---|---|---|
| 949,924 | 2/10 | Adams. |
| 968,591 | 8/10 | Newton. |
| 2,521,128 | 9/50 | Ramsay. |
| 2,563,408 | 8/51 | Luzzatti et al. |

FOREIGN PATENTS 144,103  9/59  Russia.

ROBERT F. WHITE, *Primary Examiner.*

JOSEPH REBOLD, TOBIAS E. LEVOW, ALEXANDER H. BRODMERKEL, *Examiners.*